United States Patent
Bindloss et al.

[11] Patent Number: 5,586,284
[45] Date of Patent: Dec. 17, 1996

[54] TRIPLE REGISTER RISC DIGITAL SIGNAL PROCESSOR

[75] Inventors: Keith M. Bindloss; Ricke W. Clark; Kenneth E. Garey, all of Irvine; George A. Watson, Fullerton; Lawrence F. Blank, Newport Beach, all of Calif.

[73] Assignee: Rockwell International Corporation, Seal Beach, Calif.

[21] Appl. No.: 547,050

[22] Filed: Oct. 23, 1995

Related U.S. Application Data

[63] Continuation of Ser. No. 917,872, Jul. 23, 1992, abandoned.
[51] Int. Cl.$^6$ ............................................. G06F 12/00
[52] U.S. Cl. ............................ 395/421.05; 395/401
[58] Field of Search ............................. 395/401, 421.05

[56] References Cited

U.S. PATENT DOCUMENTS

| | | | |
|---|---|---|---|
| 3,454,932 | 7/1969 | Bahrs et al. | 340/172.5 |
| 4,131,940 | 12/1978 | Moyer | 395/250 |
| 4,550,368 | 10/1985 | Bechtolsheim | 395/416 |
| 5,218,674 | 6/1993 | Peaslee et al. | 395/166 |
| 5,222,222 | 6/1993 | Mehring et al. | 395/417 |
| 5,309,156 | 5/1994 | Fujiyama | 341/67 |

FOREIGN PATENT DOCUMENTS

| | | | |
|---|---|---|---|
| 0206653 | 12/1986 | European Pat. Off. | G06F 9/30 |
| 0227900 | 7/1987 | European Pat. Off. | G06F 9/36 |
| 0293851 | 12/1988 | European Pat. Off. | G06F 15/00 |
| 61177540 | 8/1986 | Japan | G06F 7/00 |

*Primary Examiner*—Jack A. Lane
*Attorney, Agent, or Firm*—George A. Montanye; Charles T. Silberberg; Tom Streeter

[57] ABSTRACT

The STREAMER FOR RISC DIGITAL SIGNAL PROCESSOR shown herein allows a CPU 46 to interface with a memory 60 via data registers 50. Pre-fetch and post-store of the correct address is determined by an address generator 58 according to a rule determined by a context register 52. An index indicative of this address is stored in an index register 54. The data, context, and index registers together form a streamer 56, streaming data between the CPU 46 and data memory 60. The rule of the context register 52 also drives a converter 62 for converting data between memory format and register format. The speed and flexibility of a RISC device is combined with the intensive memory access of a digital signal processor.

10 Claims, 3 Drawing Sheets

TRIPLE REGISTER RISC DIGITAL SIGNAL PROCESSOR

This is a continuation application of application Ser. No. 07/917,872, filed on Jul. 23, 1992, now abandoned.

BACKGROUND OF THE INVENTION

A Reduced Instruction Set Computer (RISC) enjoys improved throughput by having the Central Processing Unit (CPU) receive, temporarily store, and output data to registers rather than memory addresses. Registers can be placed physically closer to the CPU than a memory can, and they operate faster as well. The only permitted interactions with the memory are LOAD (data from the memory into a register) and STORE (data from a register into the memory). It is this dramatically reduced number of instructions which gives RISC its name.

Many applications, particularly digital signal processing (DSP), require intensive access to the memory. A typical instruction, such as MAC (multiply and accumulate, i.e., multiply two numbers together and add the product to a third number) can require several memory accesses. The prior RISC art has been to load the multiplicand into a first register (one clock cycle), load the multiplier into a second register (a second clock cycle), and multiply the two numbers together and add the product to the contents of a third register and replace the sum back into the third register (a third clock cycle). All this calculation can go on in the same amount of time as was needed to get a single number from the memory. This disparity has fueled enhancements to the bare RISC architecture.

Pre-fetching can keep the MAC apparatus busy all the time, rather than only a third of the time, if the address from which the data is to be loaded is known several clock cycles in advance. If long runs of consecutive addresses are to be accessed, it takes relatively few cycles to specify the initial address, whether every address or only every other address (or every third address) should be accessed, etc. If multiple short runs are to be accessed, however, the overhead involved in setting up each run can become prohibitive. A processor with multiple execution units can keep the MAC apparatus busy, but multiple units (or, worse, multiple processors) are multiply expensive. A computational unit other than a MAC has a similar problem. The present invention provides a low cost alternative to the problem of keeping the computational unit busy.

SUMMARY OF THE INVENTION

The present invention exploits the fact that the registers need not be identical, and generally are not. Some registers ("data registers") are used to pass data back and forth between the CPU and the memory, other registers are used to store intermediate results, and still others will have other purposes. The present invention contemplates that each of the data registers will be associated with two other non-data registers, hereafter called an index register and a context register. This trio of data register, index register, and context register is called a "streamer," because it streams data to and from the memory. Support logic must also be included. If desired, the index and context could be separate fields in a single register, separate context fields could be located in separate registers, etc., although this is not preferred. "Register," as used herein, therefore includes "field."

A streamer is so constructed that, when the CPU calls for data from the data register, three things happen. First, the data (that is, the contents of the data register) is provided to the CPU. Second, the index (that is, the contents of the index register) is used to generate an address. In its simplest form, the index is the address and is passed directly to the memory. If desired, however, the index may drive a ROM or other device, which in turn passes an address to the memory. Either way, the memory will load the data at that address into the data register. This data will generally be ready for the CPU when the CPU next calls for data from the data register. Third, the context (that is, the contents of the context register) is passed to an address generator. This address generator is distinct from the ROM or other apparatus referred to above, and must be present even if the ROM/other apparatus is entirely absent. The address generator also receives the index currently in the index register. It uses the context and the index to update the index.

The context register is so called from the use of the phrase "context switching" in multi-task computers. A computer may serve several users, each with its own task. When the time comes to stop working on one task and start working on another, the computer must first save the contents of all of the registers. This ordered set of contents is called a context, because it is meaningless to talk about the content of a particular register without specifying its context: what task the computer was working on, what line of code it had gotten to, what intermediate results it had so far calculated, etc.

It is similarly meaningless to talk about the content of the index register without specifying, in the context register, how the next index (address) is to be calculated. In the simplest situation, the next address to be considered may well be the next address numerically, in a single block of addresses. A more complex situation is shown, however, in FIG. 1. A rectangular memory 10 has a low address 12, with increasing addresses as the top line 14 is scanned left to right, until a right end address 16 of top line 14 is reached. The next higher address is the left end address 18 of second line 20. Suppose that only a sub-memory 22 needs to be scanned. It has a top sub-line 24 with a left end address 26 and a right end address 28, but the left end address 30 of second sub-line 32 is not the numerically incremented address, as was true of left and right end addresses 16 and 18.

A still more complex situation is presented when, as shown in FIG. 2, an annulus between two concentric ellipses is displayed on a screen, each pixel being associated with an address in memory, and only the points within the annulus being of interest. In this situation, scanning each line on the screen would require calculating up to four points on each scan line and accessing only the addresses between the appropriate points. A fairly sophisticated address generator is required to handle both the simple and complex examples just given.

Assume for the moment that a particular CPU has only two streamers associated with it (that is, only two trios of data registers, index registers, and context registers), because only two data registers need be accessed at any one time. Each streamer (streamer A or streamer B) must then have, associated with it, an address generator (generator A or generator B) which is capable of updating its index register according to any of a number of rules, the rule being identified by its context register. When the CPU reads either data register, it simultaneously:

(a) activates the corresponding address generator to start to modify the index in the index register according to the rule stated in the context register;

(b) signals the memory to start loading the data register with the data loaded at the address currently (although not for long) specified in the index register; and (c) activates a converter, which uses the rule stated in the context register to convert the data from the form in which it was stored in memory to the form in which it will be most useful in the data register.

If the CPU can only access two data registers at a time, only two address generators need be provided to maintain maximum throughput. For lower cost implementation, a single generator could be shared, but performance might be sacrificed. If more (or fewer) data registers may be simultaneously accessed, then more (or fewer) address generators should be provided. In most applications, two generators is most appropriate. However, the number of streamers is not limited by the number of address generators. Even if only two address generators are used, may be convenient to provide several sets of streamer registers, perhaps sixteen of them.

Each of the two data registers being serviced by the address generators (one for each data register) is a part of a single streamer which has a single context register and a single index register. Since only two data registers are being read at any cycle, only two index registers need to be updated (according to the rules in the two context registers) at any cycle. The address generators can be constructed entirely without memory. Thus, each address generator modifies the index in the associated index register according to a rule which is defined entirely by the context In the associated context register. The address generator may be so constructed that the context of the streamer accessed during the previous cycle has no effect; and this may be done regardless of whether the same streamer was accessed twice in a row or if different streamers were successively accessed.

In one convenient embodiment of the present invention, the same physical streamer data register is given three separate addresses, to specify three different ways of using the streamer's index register, or IR, and context register, or CR, to access data into (or out of) the streamer's data register, or DR. A streamer in this embodiment is called a "multiple address streamer." Multiple address streamers and single address streamers may be present in the same data processor.

The first DR address (or a few of its bits) is so constructed as to combine with the context (or a few of its bits) in such a way as to disable the pre-fetch command. This streamer address is conveniently accessed when data at a particular memory address needs to be repeatedly accessed.

When the second DR address is accessed, it (or a few of its bits) is combined with the context (or a few of its bits) to indicate that the index is to be incremented by a first displacement. This first displacement may conveniently be located in another portion of the CR, but may alternatively be located in an entirely separate register if desired. It may even be totally implied, for example, "increment by one," as will be desired when an interior (non-end) address in the sub-memory its being accessed.

Accessing the third DR address similarly causes a second displacement to be accessed. This conveniently is done at the right end of a scan sub-line of the sub-memory being scanned. If the sub-memory 22 is rectangular (FIG. 1), this third displacement will be a constant. It may easily be stored in part of the CR, thereby providing flexibility in selecting the sub-memory to be scanned, but not requiring a separate register. Such a separate register its desirable in, for example, the double-ellipse sub-memory 34 shown in FIG. 2. While the CPU is scanning the interior of the annulus, a separate co-processor may be calculating the displacement needed to jump to the left end of the next sub-line. This may (sub-lines 36,38) or may not (sub-lines 40,42) be on the same scan line of the memory 10 taken as a whole.

The data register may be extended into an extended data register, comprising the data register proper and a data extension register to its left. The CPU can process halfword (16 bit) pairs, and data is accessed from the memory on word (32 bit) boundaries. 16 and 32 bits are preferred for halfword and word sizes, but other sizes may be used if desired. But the halfword (HW) pair may be located at an odd HW address and therefore straddle two words. A single access of a HW pair may therefore require two word accesses. However, a stream of N consecutive HW pair accesses on odd HW addresses can be accomplished in N+1 word accesses using an extended data register. Each HW pair operand uses the high HW from a memory access t and the low HW from a memory access t+1.

STREAMER INITIALIZATION AND UPDATE

Streamer initialization is accomplished using the IS instruction and refers to first initializing the index and/or context register of a streamer, and then optionally using these registers to access an operand from memory for initializing the extended data registers. An IS instruction is so named because it instructs the CPU to initialize Streamer. An operand qualifier indicates how, if at all, the source operand is to be applied in initializing the index and/or context register.

Initialization of the data register is useful when the streamer is to be used for source operands. For use for destination operands, the data register does not require initialization.

A destination qualifier controls whether or not the data register is initialized, and if so, which displacement to use in modifying the index. The default is the no prefetch destination qualifier, NPF, which completes the instruction without any memory access or modification to the data register. The prefetch qualifier, PF, means to load the data register from memory without any further modification to the index register. The prefetch with displacement one/two qualifters, PFD1 and PFD2 mean to initialize the data and data extension registers from memory and then post-modify the index register. It will be helpful to refer to the combination of the data register extended on the most significant end by the data extension register as the extended data register.

The initialization of the data register also depends on the mode of the streamer after the context register has been initialized and is described in more detail below.

Standard Mode Data Register Initialization

When executing the IS instruction in the Standard Mode, after the index and/or context registers have been initialized by the source operand, the next step is to use the new index/context values for initializing the extended data register. If the destination qualifier is NPF, the extended data register is not initialized and the instruction has completed execution. If the qualifier is PF, the index register is used as a memory address according to the data type conversion specified in the context register, and the data from memory is entered into the data register after data type conversion. No additional changes are made to the index register, and the instruction has completed execution.

If the destination qualifier is PFD1 or PFD2, the instruction execution depends on whether or not the index register address is on boundary. The index register is scaled according to element type which depends on the data type conversion specified in the context register. For all data type conversions which read single elements from memory, the index register address is always on boundary. But, for the conversions which read halfword pairs, the element size is a halfword; and for conversions which read byte pairs, the element size is a byte. Therefore, for these conversions, the index register address can be on boundary or off boundary. On boundary means that both members of the pair share the same pair address in memory and can therefore be fetched in the same memory access. That is, both halfwords of the halfword pair can be accessed together as one word, and both bytes of the byte pair can be accessed from the same memory halfword. Off boundary implies that two memory accesses are required to get both elements of the element pair.

If on boundary, the index register is used as the memory address for accessing the element or element pair from memory, which is data type converted and written into the data register. The index register is then updated with displacement one or displacement two, as selected by PFD1 or PFD2 respectively, and execution has completed.

If off boundary, two memory accesses are required to initialize the extended data register. For the first access, the index register is converted to an element pair address by dropping the least significant bit. The element pair from memory is data type converted to form a halfword pair which is loaded into the extended data register such that the least significant halfword occupies the upper halfword of the data register and the most significant halfword occupies the lower halfword of the data extension register. Displacement one or displacement two, as selected by PFD1 or PFD2 respectively, is added to the index register.

Then, for the second access, the updated index register is converted to an element pair address by dropping the least significant bit. The element pair from memory is data type converted to form a halfword pair which is loaded into the extended data register at the same bit positions as the first access, while the lower halfword of the extension register is shifted into the lower halfword of the data register. Again, displacement one or displacement two, as selected by PFD1 or PFD2 respectively, is added to the index register.

Standard Mode Data Register Update

When a Standard Mode streamer data register is referenced as a source operand, the following steps occur after the data register is made available. If the lower redundant address (A) is used to refer to the data register, then no memory access occurs and the index register is not modified. If the middle (B) or upper (C) redundant addresses are used, then the execution depends on whether or not the index is on boundary.

If on boundary, the index register is used as the memory address for accessing an element or element pair from memory, which is data type converted and written into the data register. The index register is then updated with displacement one or displacement two, as selected by the middle (B) or upper (C) redundant address respectively, and updating has completed.

If off boundary, the index register is converted to an element pair address by dropping the least significant bit. The element pair from memory is data type converted to form a halfword pair which is loaded into the extended data register such that the least significant halfword occupies the upper halfword of the data register and the most significant halfword occupies the lower halfword of the data extension register, while the lower halfword of the extension register is shifted into the lower halfword of the data register. Again, displacement one or displacement two, as selected by the middle (B) or upper (C) redundant address respectively, is added to the index register.

When a Standard Mode streamer data register is referenced as a destination operand, the instruction result is written into the data register and the following steps occur. If the lower redundant address (A) is used to refer to the data register, no memory access occurs and the index register is not modified. If the other redundant addresses are used, then displacement one or displacement two, as selected by the middle (B) or upper (C) redundant address respectively, is added to the index register after the index register is used to provide a memory address for storing the destination operand.

Stack Mode Data Register Initialization

Initialization of the data register is not required for the Stack Mode if the stack is empty. Therefore, if at the conclusion of an IS instruction, the context register specifies the Stack Mode, then the only defined destination qualifier is NPF, which means that the data register is not to be initialized. If the stack is not empty, the register contents must be saved and reloaded. The data register may have its contents saved and restored the same as the other registers, or the data may be pushed into memory and the index and context stored. This would be followed by restoring the index and context, and popping the data.

Stack Mode Data Register Update

When a Stack Mode streamer is referenced as a source operand, the data register is provided and nothing else happens if the lower redundant address (A) is used. If another redundant address is used, the data register is provided, the index register is used as a memory address according to the data type conversion specified in the context register, the memory is accessed, the data read out is data type converted, and the results are written back into the data register. Also, the index register is decremented by one or two depending on whether the middle (B) or upper (C) redundant address is used respectively.

When a streamer is referenced as a destination operand, the destination operand is written to the data register, and if the lower redundant address (A) is used, nothing else happens. If another redundant address is used, the index register is incremented by one or two depending on whether the middle (B) or upper (C) redundant address is used respectively. The data register is data type converted and stored at the memory location specified by the updated index register, then the destination operand is written to the data register.

Bit-Field Mode Data Register Initialization

When executing the IS instruction in the Bit-Field Mode, after the index and/or context registers have been initialized by the source operand, the next step is to use the new index/context values for initializing the extended data register. In this mode, the index register is scaled to a bit address. If the destination qualifier is NPF, the extended data register is not initialized and the instruction has completed execution. The PF qualifier is not defined for the Bit-Field mode.

For the other qualifiers, FPD1 and PFD2, the goal is to load the extended data register with one or two words of memory such that the bit in memory addressed by the index register appears in the lower halfword of the data register. The execution is the same for both qualifiers.

This is implemented in the following way. If the index register points to a bit in the least significant halfword of a word (the fifth bit of the index register is a ZERO), then only one access is required. The word address obtained by dropping the five least significant bits of the index register is used to access memory and the contents of memory are written into the data register. Then the index register is increased by the integer constant 48.

However, if the index register points to a bit in the most significant halfword of a word (the fifth bit of the index register is a ONE), then two memory accesses are required. For the first access, the word address formed by dropping the least significant five bits of the index register is used to access memory and the contents of memory are written into the data register. At the same time, the index register is increased by the integer constant 16, which causes the word address to increment. The second fetch uses this new word address and the data word read from memory is entered into the upper halfword of the data register and the lower halfword of the data extension register after the upper halfword of the data register has been shifted to the lower halfword of the data register. During the second access, the integer constant 32 is added to the index register.

The fifth bit of the index register indicates if data from memory is being held in the lower halfword of the extension register. If the bit is ZERO, data is being held; if the bit is ONE, only the data register has useful data from memory.

Bit-Field Mode Data Register Update

When a streamer in the Bit-Field Mode is used as a source operand, the data register is provided. If the lower redundant address (A) is used, nothing more is done. The upper redundant address (C) is undefined for the bit-field mode. If the middle redundant address (B) is used, the width of the bit-field, given by an immediate operand, is added to the index register moving it as a pointer across the bit-field. If the pointer does not cross the halfword boundary (that is, if there is no change in the halfword address bits), then nothing more is done. However, if it does (the halfword address is incremented), then the extended data register is shifted right 16 bit positions. In addition, if the pointer crosses a word boundary (that is, there is a change in the word address bits), then a word is read from memory using the word address of the index register before it was updated. This word is loaded into the upper halfword of the data register and the lower halfword of the data extension register.

As a source operand, the index register points 48 bit positions ahead of the beginning of the bit-field in the data register.

When used as a destination operand, the data register usually provided as a source operand, combined with a bit-field to be inserted and stored back into the streamer data register. If the lower redundant address (A) is used, nothing more is done. The upper redundant address (C) is undefined for the bit-field mode. If the middle redundant address (B) is used, the width of the bit-field, given by an immediate operand, is added to the index register moving it as a pointer across the bit-field. If the pointer does not cross the halfword boundary (that is, if there is no change in the halfword address bits), then nothing more is done. However, if it does (the halfword address is incremented) then the lower halfword of the data register is stored in memory using the halfword address of the index register before it was updated, and the data register is shifted right 16 bit positions.

As a destination operand, the index register points to the memory location where data will be stored.

Mixed Mode Data Register initialization

When executing the IS instruction in the Mixed Mode, after the index and/or context registers have been initialized by the source operand, the next step is to use the new index/context values for initializing the extended data register. If the destination qualifier is NPF, the extended data register is not initialized and the instruction has completed execution. The PF destination qualifier is undefined for the Mixed Mode. Both the PFD1 and PFD2 qualifiers cause the same initialization of the extended data register as described below.

The contents of the index register specify a byte address. The goal of the initialization is to have the contents of memory from that byte address end up as the least significant byte of the data register, with ascending bytes from memory occupying the more significant bytes of the extended data register.

In obtaining the data from memory, word accesses on word boundaries are performed, and only bytes from byte addresses less than the index address are discarded. Bytes from higher addresses than the index address are retained in ascending order in the extended data register. Further, unless the index address points to the least significant byte of a word address, two memory accesses are required so that at least four bytes of data from memory end up in the extended data register. After the one or two memory accesses, the contents of the index register have been increased by seven.

The hardware implements this as follows. The byte address read from the index register is first converted to a word address by dropping the two least significant bits. This word address is used for the first memory access and the 32-bit data word is entered into the data register.

During the first access an integer constant is added to the index register. If the index was on boundary, meaning that the two least significant bits were zero, the integer constant is seven. After seven is added to the index register, the initialization instruction execution has been completed.

However, if the index was off boundary, meaning that the two least significant bits were not zero, then the index is increased by the integer constant of three and a second memory access is required. The byte address from the updated index register is converted to a word address by dropping the two least significant bits and the word address is used for the second memory access. During the second memory access, the integer constant four is added to the index register.

The second word read from memory is concatenated onto the most significant end of the contents of the data register. These two words are then right shifted by one, two, or three bytes and loaded into the extended data register. Bits shifted off the least significant end are lost, and zeroes are filled at the most significant end. The number of bytes shifted is determined from the two least significant bits of the updated index register. If 2 (10), right shift 3 bytes; if 1 (01), right shift 2 bytes; if 0 (00), right shift 1 byte; and 3 (11) should not be possible. The index register instruction execution has now been completed.

The two least significant bits in the index register indicate how many bytes of data from memory remain in the extended data register, justified to the least significant end. If 3, four bytes remain; if 2, five bytes remain; if 1, six bytes remain; and if 0, seven bytes remain.

Mixed Mode Data Register Update

Whenever a streamer in the Mixed Mode is accessed as a source operand, the following steps are implemented to update the extended data register. First, the number of bytes accessed from the data register is determined by the redundant address used for the data register. The lower redundant address (A) specifies one byte; the middle redundant address (B) specifies two bytes (one halfword); and the upper redundant address (C) specifies four bytes (one word). After these bytes are read from the data register, the extended data register is shifted right by the number of bytes accessed.

Then, the index register is increased by the number of bytes accessed from the data register. If this causes the word address portion of the index register to increment (that is, causes a carry out of the second bit position), then a memory access is required. The address used for the memory access is the value of the index register before it was updated with the two least significant bits dropped to form a word address. The data word read from memory is loaded into the extended data register so as to be concatenated with the previous contents of the data register. The two least significant bits of the updated index register indicate where to load the memory data. If 3 (11), load the memory word so that the least significant byte occupies the least significant byte of the data register. If 2 (10), load the memory word so that the least significant byte occupies the second byte of the data register. Similarly, if 1 (01), it should occupy the third byte; and if 0 (00), it should occupy the most significant byte. All other bytes from memory fall into place in ascending order in the extended data register.

The update operation for a Mixed Mode source operand fetch has now been completed. Streamers in the Mixed Mode cannot be used for destination operands.

It is preferred not to modify the context register at each cycle, but simply to load it at the beginning of the CPU's run. Modification is more conveniently replaced with a single streamer having multiple addresses, thereby preserving the advantage of modification while eliminating its disadvantages. Assume, for example, that the context in the context register would need to assume one of three values so that the index might be changed by one of three displacements. This index modification can be accomplished by having the context assume only one value, but providing for an interaction between the (single) context and the (multiple) address, so that the change to the index depends on both the context and the address, and not just on the context. For example, the (single) context may include three distinct displacements, and the selection of the displacement to be added to the index may be made by the address. If desired, however, the address generator can be modified to update the context register as well as the index register.

As noted above, the context register not only provides a rule for determining the next address to be read from, but also provides a rule for converting the data at that address from the format which is most convenient for storage in the memory to the format which is most convenient for access from the CPU in the data register. Suitable apparatus is therefore provided in the data path between the memory and the data register at hand, such apparatus being driven by the context register at hand. If the register format is the same as the memory format, this apparatus may be omitted. The context register may then be devoted entirely to supporting address generation, and need not additionally support format conversion.

The foregoing description treats the problem of extracting data from the memory at such a time and in such a format that it will be available to the CPU when it is needed. The same apparatus, or a parallel apparatus, may be used to treat the inverse problem, namely, inserting data into the memory in the proper format, long after the CPU has gone onto other things. Thus, when the CPU writes to a data register, it simultaneously:

(a) activates the corresponding address generator to start to modify the index in the index register according to the rule stated in the context register;

(b) signals the memory to start storing, at the address currently (although not for long) specified in the index register, the data stored in the data register; and (c) activates a converter, which uses the rule stated in the context register to convert the data from the form in which it was stored in the data register to the form which is most convenient for the memory.

Thus, the pre-fetch step of the read cycle is matched by a parallel post-store step in the write cycle.

The context in a context register may be partially or totally reflexive. It is partially reflexive if the context which converts data from memory format to register format during a read cycle will also convert data from register format to memory format during a write cycle. It is also partially reflexive if the context which pre-fetches data from the correct memory address during a read cycle will also post-store data to the correct memory address during a write cycle. It is totally reflexive if the context satisfies both conditions. If the context is not totally reflexive, then a write streamer which is separate from the read streamers must be used. This choice adds to the attractiveness of multiple streamers. Of course, an additional address generator might be required in this situation. Alternatively, although this is not preferred, the context in the context register may be changed.

The foregoing description shows a RISC being used to process digital signals. Equivalently, it can be viewed as a DSP with the flexibility which a RISC has when not dealing with memory access; that is, it can be viewed as a DSP loosely coupled with memory. The present invention is thus able to operate software which is a blend of the software used on a RISC and on a DSP.

DETAILED DESCRIPTION OF A PREFERRED EMBODIMENT

Figure 1:
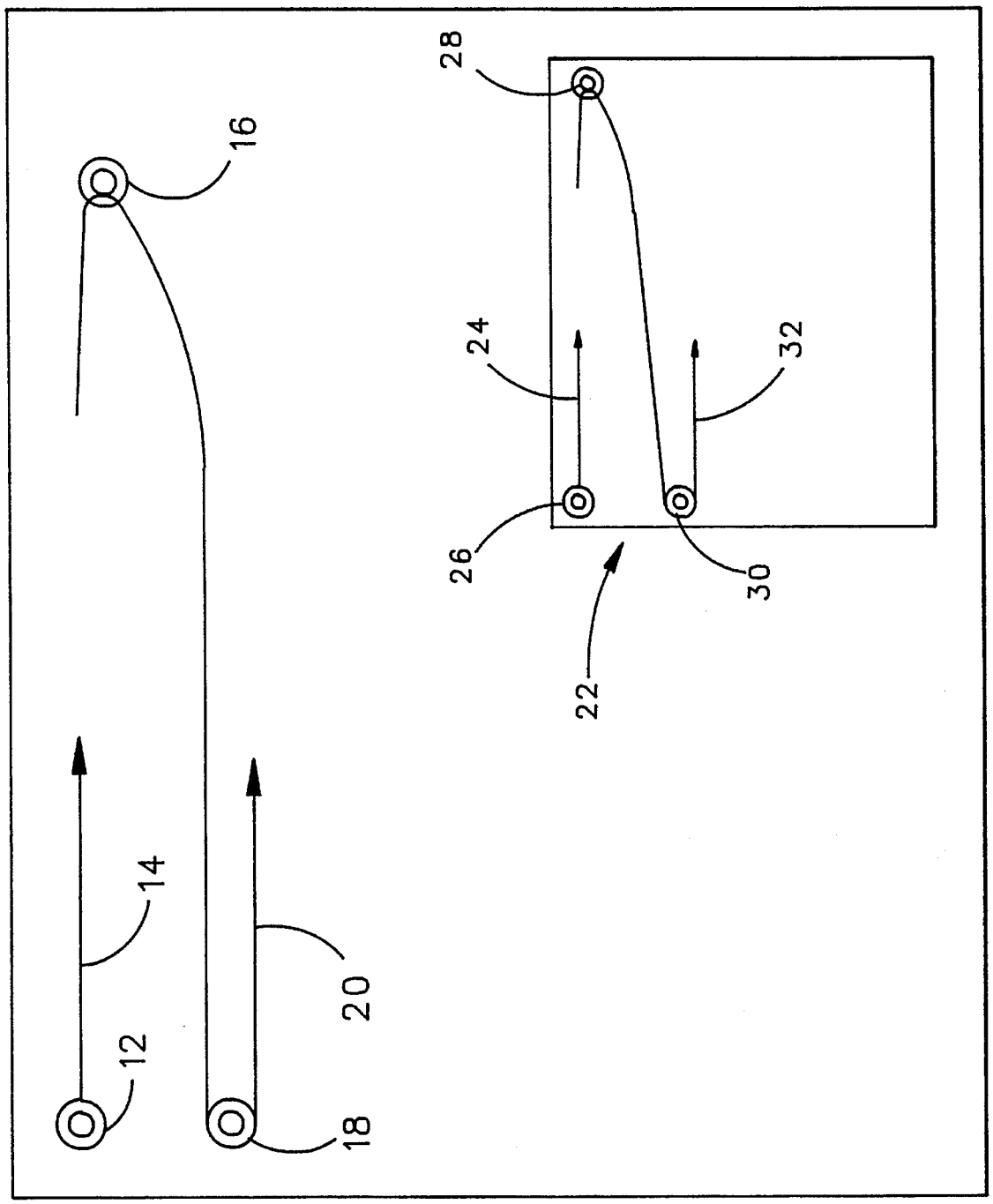
FIG. 1 shows a simple form of the problem addressed by the present invention.
Figure 2:
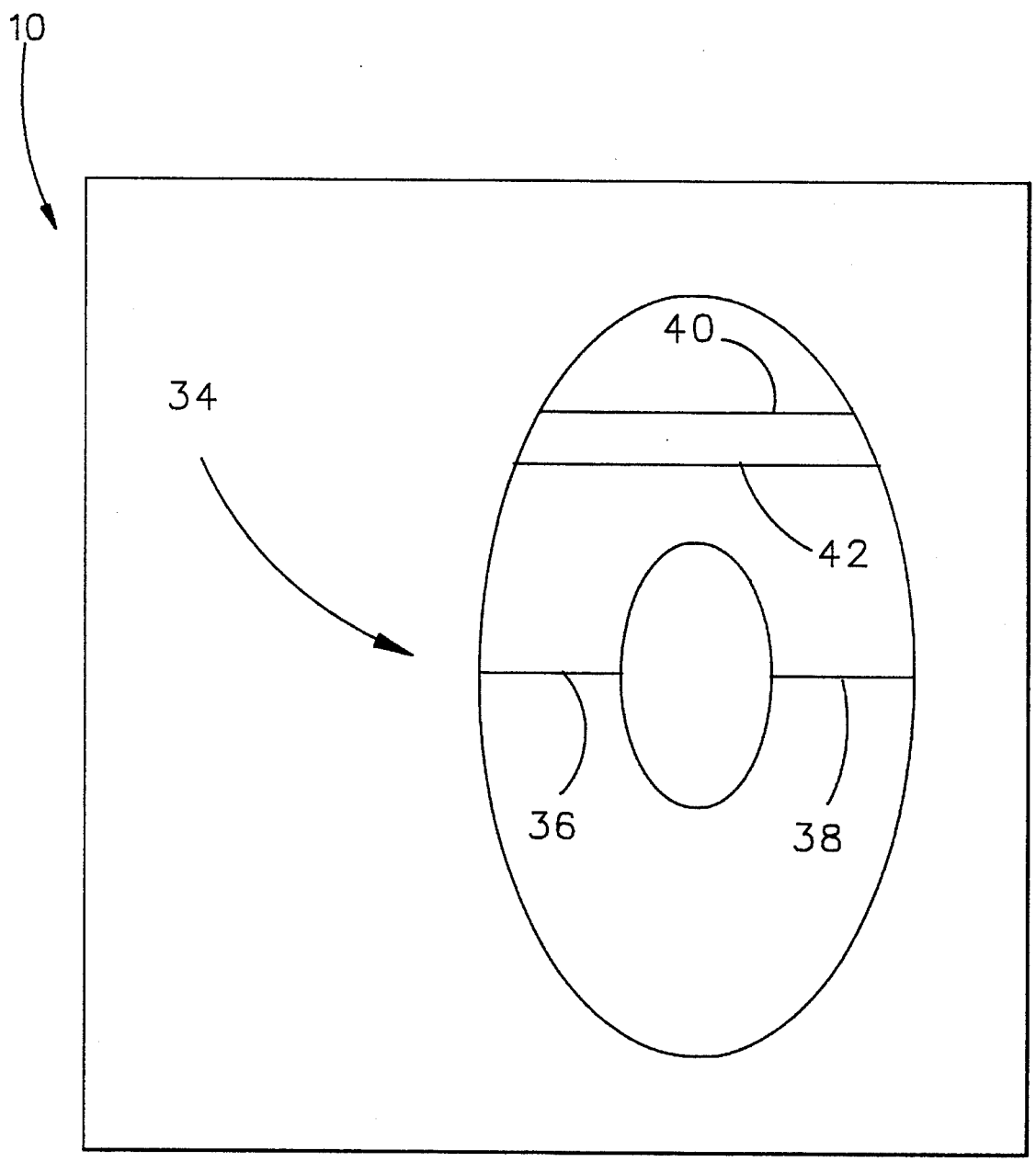
FIG. 2 shows a more complex form of the problem of FIG. 1.
Figure 3:
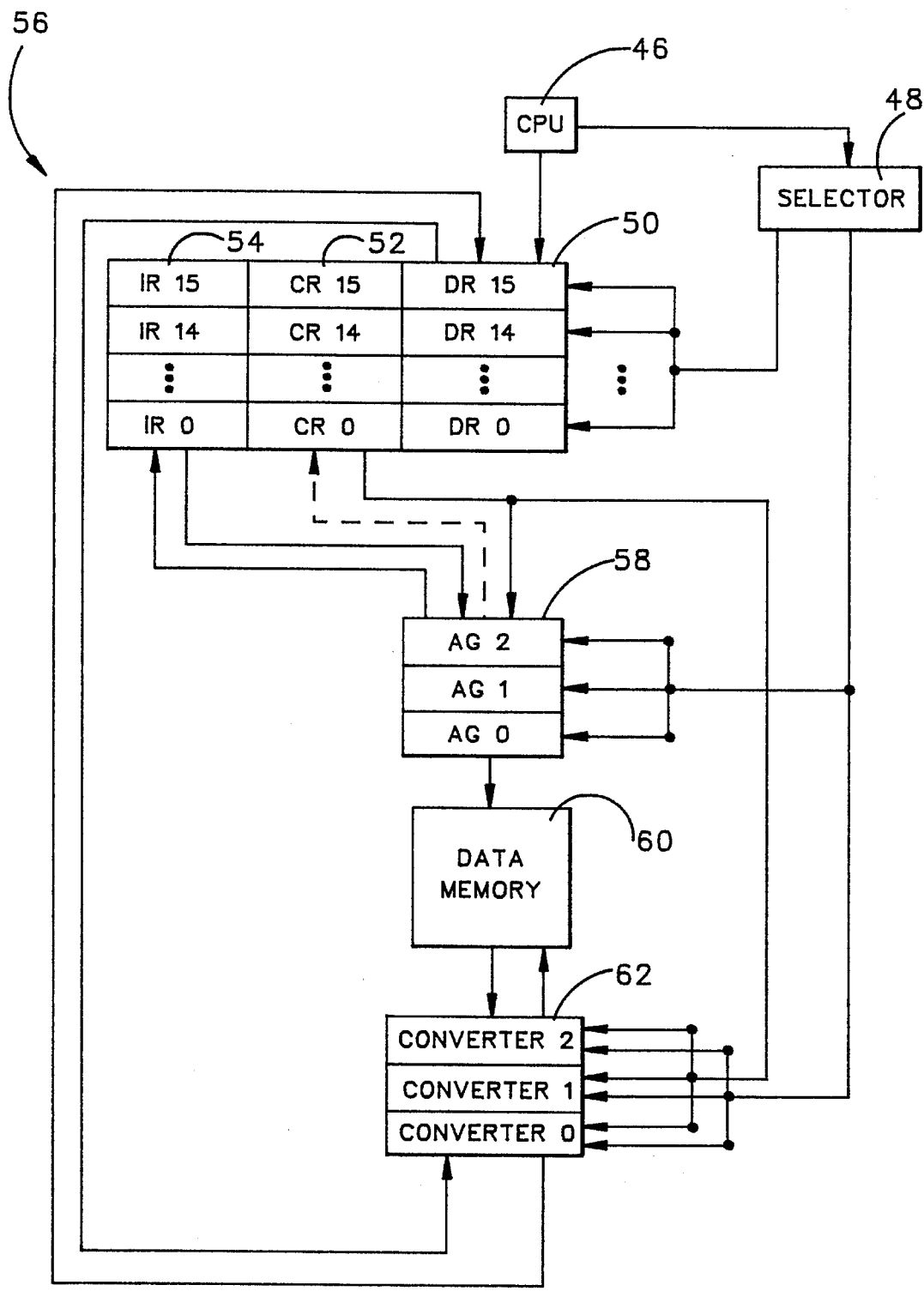
FIG. 3 is a block form drawing of the present invention.

In FIG. 3, a CPU 46 drives a selector 48 and a plurality of data registers 50. Sixteen data registers (DR0 through DR15) are shown, but more or less can be used as needed. The selector 48 determines which data register 50 is to be accessed (read from or written to). If the CPU 46 is sufficiently sophisticated, more than one data register 50 at a time can be selected.

Each data register 50 has, associated with it, a context register (CR) 52 and an index register (IR) 54, together forming a streamer 56. The context register 52 and index register 54 of the selected streamer 56 drive one of a plurality of address generators (AG) 58, the particular generator (or generators) 58 being determined by the selector 48. Three generators 58 are shown (AG0 through AG2), but one or any greater number may be used. The generator 58 generates the address in the data memory 60 which is to be loaded from or stored to, and also updates the index register 54 of the selected streamer 56. If desired, it may also update the context register 52, but this is not preferred.

The data memory 60 can, but preferably does not, directly load to or store from the selected data register 50. Instead, it drives (when loading) or is driven by (when storing) one of a plurality of converters 62 (converter 0 through converter 2). As with the address generators 58, the particular converter (or converters) 62 are determined by the selector 48. Three converters 62 are shown, but one or any greater number may be used. The converter 62 converts data in the data memory 60 from memory format to register format (when loading), or converts data in the selected data register 50 from register format to memory format (when storing), according to the rule determined by the selected context register 52.

INDUSTRIAL APPLICABILITY

The present invention is capable of exploitation in industry, and can be used, whenever it is desired to combine the intensive memory access of a digital signal processor with the speed and flexibility of a reduced instruction set computer. In can be made from components which, taken separate and apart from one another, are entirely conventional, or it can be made from their non-conventional analogs.

While a particular embodiment of the present invention has been described in some detail, the true spirit and scope of the same are not limited thereto, but are limited only by the appended claims.

What is claimed is:

1. A data processor, comprising:

(a) a central processing unit (CPU);

(b) a data memory;

(c) a selector for selecting, in response to a READ or WRITE signal from the CPU to a streamer, one of the below recited address generators to support the streamer in accessing the data memory;

(d) at least one streamer, separate from the CPU, each streamer comprising:

(i) a data register (DR) for having data read from the streamer to the CPU in response to the READ signal from the CPU and for having data written to the streamer from the CPU in response to the WRITE signal from the CPU;

(ii) a context register (CR) for storing a context, namely, information describing how:
      (A) an address for the data memory; and
      (B) a new index; are to be generated from the below described index; and (iii) an index register (IR) for storing an index, namely, information describing how an address for the data memory is to be generated; and (e) at least one address generator, separate from the CPU, constructed, in response to being selected by the selector to support a streamer:

(i) to receive a context from the CR of the supported streamer and an index from the IR of the supported streamer;

(ii) to generate, from the context and the index, an address for the data memory;

(iii) to generate, from the context and the index, a new index for the IR of the supported streamer; and (iv) to determine, from the context and the index, whether it is desirable to change the context and, if it is desirable to change the context, to generate, from the context and the index, a new context for the CR of the supported streamer.

2. The data processor of claim 1, further comprising at least one data converter constructed, in response to being selected by the selector to support a streamer:

(a) to receive a context from the CR of the supported streamer;

(b) in response to a READ signal from the CPU:

(i) to load data from an address in the data memory specified by the address generator also supporting the streamer;

(ii) to convert the data, according to the context, from a memory format to a register format; and (iii) to place the converted data in the DR of the supported streamer; and (c) in response to a WRITE signal from the CPU:

(i) to receive data from the DR of the supported streamer;

(ii) to convert the data, according to the context, from a register format to a memory format; and (iii) to store the converted data in an address in the data memory specified by the address generator also supporting the streamer.

3. The data processor of claim 1, wherein the address generator is further constructed, in response to being selected by the selector to support a streamer, to generate, from the context and the index, a new context for the CR of the supported streamer.

4. The data processor of claim 1, wherein:

(a) at least one physical streamer is constructed to be accessed by a plurality of logical addresses; and (b) the address generator is constructed to generate, from each of said logical addresses, a generated address differing from the address generated from each other such logical address.

5. The data processor of claim 4, wherein:

(a) each such streamer is constructed to be accessed by first, second, and third addresses;

(b) the combination of CR and IR is constructed to interact with the first address in such a manner as to avoid any LOAD from, or STORE to, the data memory at an address differing from a pre-selected address;

(c) the combination of CR and IR is constructed to interact with the second address in such a manner as to produce a LOAD from, or STORE to, the data memory at an address differing by a first pre-loaded displacement from the pre-selected address; and (d) the combination of CR and IR is constructed to interact with the third address in such a manner as to produce a LOAD from, or STORE to, the data memory at an address differing by a second pre-loaded displacement from the pre-selected address.

6. The data processor of claim 1, further comprising:

(a) a data extension register (DER) to a left (more significant) side of the DR, the DER and the DR together forming an extended data register (EDR); and (b) a barrel shifter constructed to barrel shift bits within the EDR;

wherein the DR and DER are both In communication with the data memory and the DR is in communication with the CPU.

7. The data processor of claim 6, further comprising:

(a) means for reading a bit-field from a lower halfword of the DR;

(b) means for barrel shifting the EDR a halfword to the right if the bit-field crosses a halfword boundary;

(c) means for loading a word from the data memory to a portion of the EDR consisting of a lower halfword of the DER and an upper halfword of the DR if the bit-field crosses a word boundary; and (d) means for barrel shifting the EDR a halfword to the right if the bit-field crosses a word boundary.

8. The data processor of claim 6, further comprising:

(a) means for writing a bit-field from the CPU to a lower halfword of the DR;

(b) means for barrel shifting the EDR a halfword to the left if the bit-field crosses a halfword boundary;

(c) means for barrel shifting the EDR a halfword to the left if the bit-field crosses a word boundary; and (d) means for storing a word to the data memory from a portion of the EDR consisting of a lower halfword of the DER and an upper halfword of the DR if the bit-field crosses a word boundary.

9. The data processor of claim 1, wherein a streamer comprises a combination of CR and IR which is constructed:

(a) to load the DR of the streamer with a sequence of N bits from the data memory;

(b) to concatenate the sequence with a previous content of the DR; and (c) to barrel shift the concatenated content of the DR by into the CPU.

10. The data processor of claim 1, wherein a streamer comprises a combination of CR and IR which is constructed:

(a) to write to the DR of the streamer with an increment of data, the increment having a length;

(b) to concatenate the increment with a previous content of the DR; and (c) to barrel shift the concatenated content of the DR by the length into the data memory.

* * * * *